United States Patent
Gaffney

(10) Patent No.: US 6,402,989 B1
(45) Date of Patent: Jun. 11, 2002

(54) CATALYTIC PARTIAL OXIDATION PROCESS AND PROMOTED NICKEL BASED CATALYSTS SUPPORTED ON MAGNESIUM OXIDE

(75) Inventor: Anne M. Gaffney, West Chester, PA (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 09/626,665

(22) Filed: Jul. 27, 2000

Related U.S. Application Data

(60) Provisional application No. 60/146,637, filed on Jul. 30, 1999.

(51) Int. Cl.⁷ .............................. C07C 1/02; C07C 27/00
(52) U.S. Cl. ......................... 252/373; 518/702; 518/703
(58) Field of Search .......................... 252/373; 518/702, 518/703

(56) References Cited

U.S. PATENT DOCUMENTS

| | | | |
|---|---|---|---|
| 4,075,122 A | 2/1978 | Vrieland et al. | 252/437 |
| 4,255,284 A | 3/1981 | Hardman | 252/437 |
| 4,258,268 A | 3/1981 | Björnson | 568/350 |
| 4,331,544 A | 5/1982 | Takaya et al. | 252/443 |
| 4,877,550 A | 10/1989 | Goetsch et al. | 252/373 |
| 5,149,464 A | 9/1992 | Green et al. | 252/373 |
| 5,338,488 A | 8/1994 | Choudhary et al. | 252/373 |
| 5,368,835 A | 11/1994 | Choudhary et al. | 423/651 |
| 5,510,056 A | 4/1996 | Jacobs et al. | 252/373 |
| 5,614,163 A | 3/1997 | Bhattacharyya et al. | 423/418.2 |
| 5,648,582 A | 7/1997 | Schmidt et al. | 585/652 |
| 5,744,419 A | 4/1998 | Choudhary et al. | 502/326 |
| 5,855,815 A | 1/1999 | Park et al. | 252/373 |

FOREIGN PATENT DOCUMENTS

| | | | |
|---|---|---|---|
| EP | 0 303 438 | 8/1988 | C01B/3/38 |
| WO | WO93/09870 | 5/1993 | |
| WO | WO99/15459 | 1/1999 | |

OTHER PUBLICATIONS

PCT International Search Report, Dated Nov. 14, 2000; (4 p.).
V.R. Choudhary et al.; Beneficial Effects of Cobalt Addition to Ni–Catalysts for Oxidative Conversion of Methane to Syngas; Applied Catalysis A: General 152:235–238 (1997).
V.R. Choudhary et al; Oxidative Conversion of Methane to Syngas Over NiO/MgO Solid Solution Supported on Low Surface Area Catalyst Carrier; Fuel Processing Tech 60: 203–211 (1999).
Eli Ruckenstein et al; Combination of Co2 Reforming and Partial Oxidation of Methane Over NiO/MgO Solid Solution Catalysts; Ind. Eng. Chem. Res. 37:1744–1747 (1998).
Eli Ruckenstein et al; Methane Partial Oxidation Over NiO/MgO Solid Solution Catalysts; Applied Catalysis A: General 183: 85–92 (1999).

V.R. Choudhary et al.; Oxidative Conversion of Methane to Syngas Over Nickel Supported on Commercial Low Surface Area Porous Catalyst Carriers Precoated with Alkaline and Rare Earth Oxides; J. Catalysis 172: 281–293 (1997).
Eli Ruckenstein et al.; Methane Partial Oxidation Over NiO/MgO Solid Solution Catalysts; Applied Catalysis A: General 183: 85–92 (1999).
Yun Hang Hu, et al; Isotopic Study of the Reaction of Methane with the Lattice Oxygen of a NiO/MgO Solid Solution; Catalysis Letters 57: 167–169 (1999).
Yun Hang Hu, et al.; Catalyst Temperature Oscillations During Partial Oxidation of Methane; Ind. Eng. Chem. Res. 37: 2333–2335 (1998).
Yun Hang Hu et al; Broadened Pulse–Step Change–Isotopic Sharp Pulse Analysis of the Mechanism of Methane Partial Oxidation to Synthesis Gas, J. Phys. Chem. B. 102: 230–233 (1998).
Eli Ruckenstein et al.; The Effect of Precursor and Preparation conditions of MgO on the $Co_2$ Reforming of $CH_4$ Over NiO/MgO Catalysts; Applied Catalysis A: General 154: 185–205 (1997).
Yun Hang Hu et al; The Characterization of a Highly Effective NiO/MgO Solid Solution Catalysts in the $CO_2$ Reforming of $CH_4$; Catalysis Letters 43: 71–77 (1997).
Y.H. Hu et al; An Optimum NiO Content in the $CO_2$ Reforming of $CH_4$ With NiO/Mg Solid Solution Catalysts; Catalysis Letters 35: 145–149 (1996).
Eli Ruckenstein et al; Carbon Dioxide reforming of Methane Over Nickel/Alkaline Earth Metal Oxide Catalysts; Applied Catalysis A: General 133: 149–161 (1995).
V. R. Choudhary et al,; Large Enhancement in Methane–to–Syngas Conversion Activity of Supported Ni Catalysts Due to Precoating of Catalyst Supports with MgO, CaO or Rare–Earth Oxide; Catalysis Letters 32: 387–390 (1995).
V. R. Choudhary et al; Low–Temperature Selective Oxidation of Methane to Carbon Monoxide and Hydrogen Over Cobalt–MgO Catalysts; Applied Catalysis A: Gerneal 90: L1–L5 (1992).
V. R. Choudhary et al; Selective Oxidation of Methane to CO and $H_2$ Over Ni/MgO at low Temperatures; Int. Ed Engl. 31: No. 9; (1189–1190), (1992).

(List continued on next page.)

Primary Examiner—Johann Richter
Assistant Examiner—J. Parsa
(74) Attorney, Agent, or Firm—Conley, Rose & Tayon P.C.

(57) ABSTRACT

A process and catalyst are disclosed for the catalytic partial oxidation of light hydrocarbons to produce synthesis gas. The process involves contacting a feed stream comprising the hydrocarbon feedstock and an oxygen-containing gas with a catalyst in a reaction zone maintained at conversion-promoting conditions effective to produce an effluent stream comprising carbon monoxide and hydrogen in a molar ratio of about 2:1 $H_2$:CO. A preferred supported catalyst used in the process includes nickel and magnesium oxide, with a promoter selected from the group including manganese, molybdenum, tungsten, tin, rhenium, bismuth, indium, phosphorus, and combinations thereof.

15 Claims, No Drawings

OTHER PUBLICATIONS

V. R. Choudhary et al; Partial Oxidation of Methane to CO and $H_2$ Over Nickel and/or Cobalt Containing $ZrO_2$, $ThO_2$, $UO_2$, $TiO_2$ and $SiO_2$ Catalysts; Fuel 1998 vol. 77, No. 15; (pp. 1803–1807).

V. R. Choudhary et al; $CO_2$ Reforming and Simultaneous $Co_2$ and Steam Reforming of Methane to Syngas Over $CO_x Ni_{1-x}O$ Supported on Macroporous Silica–Alumina Pre-coated with MgO; Proceedings of Symposium on $CO_2$ Conversion and Utilization in Refinery and Chemical Processing Mar. 26–31, 2000; 43: 164–167 (2000).

V. R. Choudhary et al; NiO–Alkaline Earth Oxide Catalysts for Oxidative Methane to Syngas Conversion: Influence of Alkaline Earth Oxide on the Surface Properties and Temperature–Programmed Reduction/Reaction by $H_2$ and Methane J. Catalysis 178: 576–585, (1998).

V. R. Choudhary et al; Simultaneous Oxidative Conversion and $CO_2$ or Steam Reforming of Methane to Syngas Over CoO–NiO–MgO Catalyst; Chem. Technal. Biotechnal. 73: 345–350 (1998).

CATALYTIC PARTIAL OXIDATION PROCESS AND PROMOTED NICKEL BASED CATALYSTS SUPPORTED ON MAGNESIUM OXIDE

CROSS-REFERENCE TO RELATED APPLICATIONS

This application claims the benefit of U.S. Provisional Application No. 60/146,637 filed Jul. 30, 1999, the disclosure of which is incorporated herein by reference.

STATEMENT REGARDING FEDERALLY SPONSORED RESEARCH OR DEVELOPMENT

No applicable.

FIELD OF THE INVENTION

The present invention relates to catalysts and processes for the catalytic partial oxidation of hydrocarbons (e.g., natural gas), for the preparation of a mixture of carbon monoxide and hydrogen using a supported metal catalyst. More particularly, the invention relates to catalysts and processes using catalysts comprising promoted nickel-based catalysts supported on magnesium oxide.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population, and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or "syngas"). In a second step, the syngas is converted to hydrocarbons.

Current industrial use of methane as a chemical feedstock proceeds by the initial conversion of methane to carbon monoxide and hydrogen by either steam reforming, which is the most widespread process, or by dry reforming. Steam reforming currently is the major process used commercially for the conversion of methane to synthesis gas, proceeding according to Equation 1.

$$CH_4 + H_2O \Leftrightarrow CO + 3H_2 \qquad (1)$$

Although steam reforming has been practiced for over five decades, efforts to improve the energy efficiency and reduce the capital investment required for this technology continue.

The catalytic partial oxidation of hydrocarbons, e.g., natural gas or methane to syngas is also a process known in the art. While currently limited as an industrial process, partial oxidation has recently attracted much attention due to significant inherent advantages, such as the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2:CO$ ratio of 2:1, as shown in Equation 2.

$$CH_4 + 1/2 O_2 \Leftrightarrow CO + 2H_2 \qquad (2)$$

This ratio is more useful than the $H_2:CO$ ratio from steam reforming for the downstream conversion of the syngas to chemicals such as methanol and to fuels. The partial oxidation is also exothermic, while the steam reforming reaction is strongly endothermic. Furthermore, oxidation reactions are typically much faster than reforming reactions. This allows the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch Synthesis.

The selectivities of catalytic partial oxidation to the desired products, carbon monoxide and hydrogen, are controlled by several factors, but one of the most important of these factors is the choice of catalyst composition. Difficulties have arisen in the past in making such a choice economical. Typically, catalyst compositions have included precious metals and/or rare earths. The large volumes of expensive catalysts needed by present day catalytic partial oxidation processes have placed these processes generally outside the limits of economic justification.

For successful operation at commercial scale, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance. Accordingly, substantial effort has been devoted in this field to the development of catalysts allowing commercial performance without coke formation.

A number of process regimes have been proposed for the production of syngas via partial oxidation reactions. For example, the process described in U.S. Pat. No. 4,877,550 employs a syngas generation process using a fluidized reaction zone. Such a process however, requires downstream separation equipment to recover entrained supported-nickel catalyst particles.

A fixed bed reactor configuration would alleviate the catalyst degradation, but would require a pressure differential (pressure drop) to allow gas flow over the catalyst. To overcome the relatively high pressure drop associated with gas flow through a fixed bed of catalyst particles, which can prevent operation at the high gas space velocities required, various structures for supporting the active catalyst in the reaction zone have been proposed. U.S. Pat. No. 5,510,056 discloses a monolithic support such as a ceramic foam or fixed catalyst bed having a specified tortuosity and number of interstitial pores that is said to allow operation at high gas space velocity. The preferred catalysts for use in the process comprise ruthenium, rhodium, palladium, osmium, iridium, and platinum. Data are presented for a ceramic foam supported rhodium catalyst at a rhodium loading of from 0.5–5.0 wt %.

U.S. Pat. No. 5,648,582 also discloses a process for the catalytic partial oxidation of a feed gas mixture consisting essentially of methane. The methane-containing feed gas mixture and an oxygen-containing gas are passed over an alumina foam supported metal catalyst at space velocities of 120,000 hr.$^{-1}$ to 12,000,000 hr.$^{-1}$ The catalytic metals exemplified are rhodium and platinum, at a loading of about 10 wt %.

Catalysts containing Group VIII metals such as nickel on a variety of supports are known in the art. For example, V. R. Choudhary et al. ("Oxidative Conversion of Methane to Syngas over Nickel Supported on Low Surface Area Catalyst Porous Carriers Precoated with Alkaline and Rare Earth Oxides," J. Catal., Vol. 172, pages 281–293, 1997) disclose the partial oxidation of methane to syngas at contact times of 4.8 ms (at STP) over supported nickel catalysts at 700 and 800° C. The catalysts were prepared by depositing NiO—MgO on different commercial low surface area porous catalyst carriers consisting of refractory compounds such as $SiO_2$, $Al_2O_3$, SiC, $ZrO_2$ and $HfO_2$. The catalysts were also prepared by depositing NiO on the catalyst carriers with different alkaline and rare earth oxides such as MgO, CaO, SrO, BaO, $Sm_2O_3$ and $Yb_2O_3$.

U.S. Pat. No. 5,149,464 discloses a method for selectively converting methane to syngas at 650° C. to 950° C. by contacting the methane/oxygen mixture with a solid catalyst, which is either:

(a) a catalyst of the formula $M_xM'_yO_z$ where:

M is at least one element selected from Mg, B, Al, Ln, Ga, Si, Ti, Zr and Hf;

Ln is at least one member of lanthanum and the lanthanide series of elements,

M' is a d-block transition metal, and each of the ratios x/z and y/z and (x+y)/z is independently from 0.1 to 8; or (b) an oxide of a d-block transition metal; or (c) a d-block transition metal on a refractory support; or (d) a catalyst formed by heating a) or b) under the conditions of the reaction or under nonoxidizing conditions.

The d-block transition metals are stated to be selected from those having atomic number 21 to 29, 40 to 47 and 72 to 79, the metals scandium, titanium, vanadium, chromium, manganese, iron, cobalt, nickel, copper, zirconium, niobium, molybdenum, technetium, ruthenium, rhodium, palladium, silver, hafnium, tantalum, tungsten, rhenium, osmium, iridium, platinum and gold. Preferably M' is selected from Fe, Os, Co, Rh, Ir, Pd, Pt and particularly Ni and Ru. The exemplary conversions, selectivities, and gas hourly space velocities are relatively low however, while reaction temperatures are relatively high, and the effects of coke formation are not addressed.

U.S. Pat. No. 5,855,815 (Park) describes certain alkali-element promoted NiO catalysts supported on silicon-containing supports. These catalysts are used for $CO_2$ reforming of methane with or without the addition of $O_2$ and $H_2O$.

E. Ruckenstein et al. (Applied Catalysis A: General 183:85–92 (1999); Ind Eng. Chem. Res. 37:17441747 (1998)) describe certain solid solution catalysts for partial oxidation of methane and $CO_2$ reforming of methane containing NiO supported on MgO, $SiO_2$, $AlO_3$ or $La_2O_3$.

U.S. Pat. No. 5,744,4:19 (Choudhary et al.) describes certain supported Ni and Co catalysts, with noble metal promoters, that are employed for the production of syngas by partial oxidation with oxygen or oxidative steam and/or $CO_2$ reforming with oxygen of methane or light hydrocarbons.

U.S. Pat. No. 5,368,835 (Choudhary et al.) and U.S. Pat. No. 5,338,488 (Choudhary et al) describe certain Ni-based composite catalysts containing various rare earth or alkaline earth elements, for catalyzing the production of synthesis gas by oxidative conversion of methane.

V. R. Choudhary et al. (J. Catalysis 178:576–585 (1998)) describe processes for the oxidative conversion of methane to syngas catalyzed by NiO supported on various oxides such as CaO, MgO and rare earth oxides. Support effects on NiO in the partial oxidation of methane to syngas are discussed. The beneficial effects of adding Co to certain NiO catalysts for oxidative conversion of methane to syngas have also been described (Chaudhary et al. Applied Catalysis A: General 162:235–238 (1997)).

There have been previous attempts at synthesis gas production by catalytic partial oxidation to overcome some of the disadvantages and costs of steam reforming. In EPO 303438, for example, the asserted advantages of the process disclosed therein are described as being relatively independent of catalyst composition., i.e., " . . . partial oxidation reactions will be mass transfer controlled. Consequently, the reaction rate is relatively independent of catalyst activity, but dependent on surface area-to-volume ratio of the catalyst." No promoters are suggested. In that process, a monolith catalyst is used with or without metal addition to the surface of the monolith at space velocities of 20,000–500,000 $hr^{-1}$. The suggested metal coatings of the monolith are palladium, platinum, rhodium, iridium, osmium, ruthenium, nickel, chromium, cobalt, cerium, lanthanum, and mixtures thereof, in addition to metals of the groups IA, IIA, III, IV, VB, VIB, or VIIB. Steam is required in the feed mixture to suppress coke formation on the catalyst, and significant quantities of carbon dioxide, steam, and $C_2$+hydrocarbons are produced in addition to the desired CO and $H_2$.

None of the existing processes or catalysts provide a partial oxidation catalyst or process capable of high conversion and high selectivity capable of operation with very low coke formation. Accordingly, there exists a need for a process and catalyst for the catalytic partial oxidation of hydrocarbons, particularly methane, that has low coke formation, high conversions of methane and high selectivities to CO and $H_2$, and that is economically feasible at commercial-scale conditions.

SUMMARY OF THE INVENTION

The present invention provides a process and catalysts for the catalytic partial oxidation of a hydrocarbon feedstock, and a method for preparing the catalysts. The new catalysts and processes overcome many of the deficiencies of conventional partial oxidation catalysts and processes for producing synthesis gas. The syngas production process generally comprises the catalytic partial oxidation of a hydrocarbon feedstock by contacting a feed stream comprising a hydrocarbon feedstock and an oxygen-containing gas with a catalyst in a reaction zone maintained at conversion-promoting conditions effective to produce an effluent stream comprising carbon monoxide and hydrogen.

In accordance with the :present invention, certain embodiments of the catalyst employed in the process comprises about 1 wt. % to about 50 wt. % nickel supported on magnesium oxide and about 0.1 wt. % to about 10 wt. % of at least one promoter selected from the group consisting of manganese, molybdenum, tungsten, tin, rhenium, bismuth, indium and phosphorus.

In some embodiments, the catalyst comprises nickel, magnesium oxide, and a promoter selected from the group consisting of manganese, molybdenum, tungsten, tin, rhenium, bismuth, indium, phosphorus (metals and metal oxides), and combinations thereof.

In some embodiments, a supported partial oxidation catalyst comprising nickel, magnesium oxide, and a promoter selected from the group consisting of manganese, molybdenum, tungsten, tin, rhenium, bismuth, indium, phosphorus (metals and metal oxides), and combinations thereof, is provided.

Also in accordance with the invention, a method is provided for preparing a partial oxidation catalyst that operates at relatively low temperatures, and has high activity and selectivity for producing CO and $H_2$ from methane. In some embodiments the method comprises preparing an aqueous solution of a nickel salt and a promoter, impregnating a magnesium oxide solid with the solution, calcining the impregnated solid, and reducing the calcined solid.

Also in accordance with the present invention is provided a method of converting a reactant gas mixture comprising a $C_1$–$C_5$ hydrocarbon and oxygen into a product gas mixture comprising CO and $H_2$ by a net partial oxidation process. In some embodiments the method includes contacting the reactant gas mixture at partial oxidation promoting conditions of temperature and pressure with a supported catalyst comprising nickel, magnesium oxide, and one or more elements selected from the group consisting of manganese, molybdenum, tungsten, tin, rhenium, bismuth, indium and phosphorus.

Still other embodiments, features and advantages of the present invention will appear from the following description.

DETAILED DESCRIPTION OF THE INVENTION

The term "catalytic partial oxidation" when used in the context of the present syngas production methods, in addition to its usual meaning, can also refer to a net catalytic partial oxidation process, in which hydrocarbons (comprising mainly methane) and oxygen are supplied as reactants and the resulting product stream is predominantly the partial oxidation products CO and $H_2$, rather than the complete oxidation products $CO_2$ and $H_2O$. For example, the preferred catalysts serve in the short contact time process of the invention, which is described in more detail below, to yield a product gas mixture containing $H_2$ and CO in a molar ratio of approximately 2:1. Although the primary reaction mechanism of the process is partial oxidation, other oxidation reactions may also occur in the reactor to a lesser or minor extent. As shown in Equation (2), the partial oxidation of methane yields $H_2$ and CO in a molar ratio of 2:1.

A process according to the present invention may be used to prepare a mixture of carbon monoxide and hydrogen from any gaseous hydrocarbon having a low boiling point, such as methane, natural gas, associated gas, or other sources of light hydrocarbons having from 1 to 5 carbon atoms. The new process is characterized by low coke formation, high conversions of methane and high selectivities to CO and $H_2$ products, and is economically feasible at commercial-scale conditions.

The hydrocarbon feedstock is in the gaseous phase when contacting the catalyst. Natural gas is mostly methane, but it can also contain up to about 25 mole % ethane, propane, butane and higher hydrocarbons. The new process may be used for the conversion of gas from naturally occurring reserves of methane, which can also contain carbon dioxide, nitrogen, hydrogen sulfide, and other minor components. Preferably, the feed comprises at least 50% by volume methane, more preferably at least 75% by volume methane and, most preferably at least 80% by volume methane.

The hydrocarbon feedstock is contacted with the catalyst as a mixture with an oxygen-containing gas, preferably pure oxygen. The oxygen-containing gas may also comprise steam and/or $CO_2$ in addition to oxygen. Alternatively, the hydrocarbon feedstock is contacted with the catalyst as a mixture with a gas comprising steam and/or $CO_2$.

A methane-containing feedstock and the oxygen-containing gas are preferably mixed in such amounts to give a carbon (i.e., carbon in methane) to oxygen (i.e., oxygen) ratio from about 1.25:1 to about 3.3:1, more preferably from about 1:3:1 to about 2.3:1, and most preferably from about 1.5:1 to about 2.2:1, especially the stoichiometric ratio of about 2:1.

The process of the present invention may be operated at atmospheric or super-atmospheric pressures, with the latter being preferred. The process may be operated at pressures of from about 100 kPa to about 12,500 kPa, and preferably from about 130 kPa to about 10,000 kPa.

The process of the present invention may be operated at temperatures of about 600° C. to about 1300° C., and preferably about 700° C. to about 1100° C. The hydrocarbon feedstock and the oxygen-containing gas may be pre-heated before contact with the catalyst, preferably the reactant gas mixture is pre-heated to a temperature of about 300–700° C., more preferably about 525° C.

The hydrocarbon feedstock and the oxygen-containing gas can be passed over the catalyst at a variety of space velocities. Typical space velocities for the process, stated as normal liters of gas per kilogram of catalyst per hour, are from about 20,000 to about 100,000,000 NL/kg/h, preferably from about 50,000 to about 50,000,000 NL/kg/h. Ceramic foam monoliths are typically placed before and after the catalyst as radiation shields. The inlet radiation shield also typically aids in uniform distribution of the feed gases.

The catalyst used in the process of the present invention preferably comprises about 1 wt. % to about 50 wt. % nickel supported on magnesium oxide, and about 0.1 wt. % to about 10 wt. % of at least one promoter selected from the group consisting of manganese, molybdenum, tungsten, tin, rhenium, bismuth, indium and phosphorus (as metals or metal oxides), and mixtures thereof. If desired, in the presence of a preferred promoters, additional promoters may be included such as metal or metal oxides of cobalt, rare earth elements, chromium, iron, vanadium, copper, alkali or alkaline earth metals (i.e., Group IA, IIA), and combinations thereof. Preferably, the catalyst is prepared using any of the techniques known to those skilled in the art, such as: impregnation, sol-gel methods, and co-precipitation. In an impregnation method of preparation, magnesium oxide is preferably contacted with solutions of a nickel salt and one or more promoter salts. The nickel salt and one or more promotor salts may be contained in the same solution and loaded onto the support in a single step, or they may be applied to the support as separate solutions, drying the support after each impregnation step. The loaded or impregnated magnesium oxide is then dried and calcined.

The catalyst composition may be supported on a carrier selected from the group consisting of spinels, perovskites, magnesium oxide, pyrochlores, brownmillerites, zirconium phosphate, magnesium stabilized zirconia, zirconia stabilized alumina, silicon carbide, yttrium stabilized zirconia, calcium stabilized zirconia, yttrium aluminum garnet; alumina, cordierite, $ZrO_2$, $MgAl_2O_4$, $SiO_2$ or $TiO_2$, preferably MgO.

The support or carriers may be in the form of powders, mesh sized particles, reticulated foams, honeycombs, perforated plates, corrugated supports, or any other support that may be desired according to the preference of those skilled in the art. Preferred supports have a tortuosity of about 1.0.

The catalyst composition, with or without a support material, may be applied to a support by any of the other methods well known in the art, such as impregnation, wash coating, adsorption, ion exchange, precipitation, co-precipitation, deposition precipitation, sol-gel method, slurry dip-coating and microwave heating. Alternatively, the catalyst components may be extruded, with or without a ceramic support composition, to prepare a three-dimensional form such as a honeycomb or a foam. Suitable foams for use in the preparation of the catalyst preferably have from 30 to 150 pores per inch (12 to 60 pores per centimeter).

The supports for use in the present invention are preferably in the form of monolithic supports or other configurations having longitudinal channels or passageways permitting high space velocities with a minimal pressure drop. Such configurations are known in the art and described in, for example, *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst") hereby incorporated herein by reference in its entirety.

Without further elaboration, it is believed that one skilled in the art can, using the description herein, utilize the present invention to its fullest extent. The following embodiments are to be construed as illustrative, and not as limiting the disclosure in any way whatsoever.

EXAMPLES

Catalyst Preparation

Comparative Example A

13% Ni/MgO $Ni(NO_3)_2 \cdot 6H_2O$ (19.325 g) was dissolved in distilled water (50 mL) to give wet impregnation when mixed with calcined (600° C. for 3 hours) MgO (26.1 g). The slurry was mixed with a spatula, and dried at 110° C., followed by calcining at 800° C. for 2 hours. A portion of the calcined material (15 g) was reduced in flowing hydrogen (about 100 cc/minute) for 4 hours at 800° C. The resulting hydrogen-reduced material was sized to 20–30 mesh (0.84–0.59 mm).

Examples 1 and 2

3% Mn/13% Ni/MgO

The preparation of the catalyst was similar to that of Example A except that $Mn(NO_3)_2 \cdot 6H_2O$ (4.702 g) was also dissolved in the nickel solution before impregnation of the MgO (25.2g).

Example 3

3% Mo/13% Ni/MgO

The preparation of the catalyst was similar to that of Examples 1 and 2 except that $(NH_4)_2MoO_4$ (1.8386 g) was also dissolved in the nickel solution before impregnation of the MgO (25.2g).

Example 4

3% W/13% Ni/MgO

The preparation of the catalyst was similar to that of Examples 1 and 2 except that $(NH_4)_2WO_4$ (1.3900 g) was also dissolved in the nickel solution before impregnation of the MgO (25.2g).

Example 5

3% Sn/13% Ni/MgO

The preparation of the catalyst was similar to that of Examples 1 and 2 except that $SnSO_4$ (1.6281 g) was also dissolved in the nickel solution before impregnation of the MgO (25.2g).

Example 6

3% Re/13% Ni/MgO

The preparation of the catalyst was similar to that of Examples 1 and 2 except that $NH_4ReO_4$ (1.2965 g) was also dissolved in the nickel solution before impregnation of the MgO (25.2g).

Example 7

3% Bi/13% Ni/MgO

The preparation of the catalyst was similar to that of Examples 1 and 2 except that $Bi(NO_3)_3 \cdot 5H_2O$ (2.089 g) was also dissolved in the nickel solution before impregnation of the MgO (25.2g).

Example 8

3% In/13% Ni/MgO

The preparation of the catalyst was similar to that of Examples 1 and 2 except that $In(NO_3)_3 \cdot 5H_2O$ (3.0641 g) was also dissolved in the nickel solution before impregnation of the MgO (25.2g).

Example 9

3% P/13% Ni/MgO

The preparation of the catalyst was similar to that of Examples 1 and 2 except that $NH_4H_2PO_4$ (3.3424 g) was also dissolved in the nickel solution before impregnation of the MgO (25.2g).

Test Procedure

Each of the catalysts for Examples 1–9 was evaluated in a quartz tube reactor 25 cm in length and with an inside diameter of 4 mm. The reactor was equipped with a co-axial quartz thermocouple well. The void space within the reactor was packed with quartz chips. The catalyst bed, which comprised a 2 mL charge of catalyst, was positioned using quartz wool at about the mid-length of the quartz tube reactor. The catalyst bed was heated with a 4-inch (10.2 cm) 600 watt band furnace, which was operated at about 90% electrical output. All test runs were done using a $CH_4:O_2$ molar ratio of 2:1, and at a pressure of 5 psig (136 kPa). The reactor effluent was analyzed using a gas chromatograph equipped with a thermal conductivity detector. The carbon, hydrogen, and oxygen mass balances calculated for each run closed to between 98% and 102%.

Each of the runs was conducted over two operating days, with 6 hours of run time each day. The results, shown below in Table 1, showed no evidence of catalyst deactivation after 12 hours of run time. The catalysts, which were recovered and analyzed after each run, showed either 1) no detectable coke, or, 2) no discernable effects on catalyst performance even though the formation of detectable coke was found.

The recovered catalysts were analyzed by high-resolution transmission electron microscopy ("HRTEM") and thermal gravimetric analysis ("TGA") after 12 hours of usage. As noted in Table 1, the un-promoted catalyst showed significant, and measurable, coke deposition (3.5 wt. %). No coke formation with the promoted catalysts was detectable in the non-supported catalysts, with the exception of the Bi (0.9 wt. %) and In (0.1 wt. %) promoted catalysts.

HRTEM analysis of the un-promoted catalyst showed the agglomeration of nickel crystals that had precipitated from the MgO matrix. Pockets of carbonaceous nano-structures on the catalyst surface were also identified. Either the precipitated nickel particles were 1) encapsulated completely in graphitic layers or, 2) led to the formation of carbon filaments. For the promoted catalysts, no such significant nickel precipitation or carbon encapsulation was observed.

TABLE 1

| Ex. | Promoter | Temp. (Reactor) °C. | GHSV × 10⁴ | % CH₄/O₂ Conv. | % CO/H₂ Sel. | % Coke[a] | H₂:CO |
|---|---|---|---|---|---|---|---|
| A | None | 850 | 6.1 | 18/58 | 49/12 | 3.5 | 0.49 |
| 1 | Mn | 885 | 6.1 | 95/100 | 97/99 | n.d.[b] | 2.0 |
| 2 | Mn | 730 | 100 | 85/100 | 96/95 | n.d | 2.0 |
| 3 | Mo | 825 | 6.1 | 99/100 | 96/99 | n.d. | 2.1 |
| 4 | W | 740 | 6.1 | 99/100 | 99/95 | n.d. | 1.9 |
| 5 | Sn | 700 | 6.1 | 99/100 | 96/90 | n.d. | 1.9 |
| 6 | Re | 630 | 6.1 | 97/100 | 99/93 | n.d. | 1.9 |
| 7 | Bi | 760 | 6.1 | 93/100 | 98/90 | 0.9 | 1.8 |
| 8 | In | 740 | 6.1 | 97/100 | 99/93 | 0.1 | 1.9 |
| 9 | P | 640 | 6.1 | 95/100 | 99/99 | n.d. | 2.0 |

[a]Coke measured after 12 hours on stream.
[b]n.d. = not detected

Examples 10, 11 and 12 are Mn-promoted Ni/MgO catalysts washcoated on cordierite honeycomb support, with different compositions of Ni, Mn and MgO.

Example 10
6.2% Ni, 0.3% Mn, 10% MgO on Cordierite Honeycomb (400 Channels Per Square Inch, 10 mm×172 mm)

A cordierite honeycomb, with a tortuosity of 1.0 (straight, parallel channels), supplied by Johnson Matthey was wash coated with an aqueous slurry of catalyst powder (prepared substantially as described in the foregoing examples), dried at 110° C. and calcined at 800° C. for 2 hours to give a monolith catalyst having the composition 6.2 wt % Ni, 0.3 wt % Mn, 10 wt % MgO on cordierite honeycomb (400 channels per square inch, 10 mm×172 mm). Alternatively, the supported catalyst could be prepared by impregnating the honeycomb with an aqueous solution of the catalyst precursors.

Example 11
1.27% Ni, 0.31% Mn, 19.7% MgO on Cordierite Honeycomb (400 Channels Per Square Inch, 10 mm×172 mm)

A cordierite honeycomb, with a tortuosity of 1.0 (straight, parallel channels), supplied by Johnson Matthey was wash coated with an aqueous slurry of catalyst powder (prepared substantially as described in the foregoing examples), dried at 110 C. and calcined at 800° C. for 2 hours to give a monolith catalyst having the composition 1.27 wt % Ni, 0.31 wt % Mn, 10 wt % MgO on cordierite honeycomb (400 channels per square inch, 10 mm×172mm). Alternatively, the supported catalyst could be prepared by impregnating the honeycomb with an aqueous solution of the catalyst precursors.

Example 12
3.39% Ni, 0.75% Mn, 20.2% MgO on Cordierite Honeycomb (400 Channels Per Square Inch, 10 mm×172 mm)

A cordierite honeycomb, with a tortuosity of 1.0 (straight, parallel channels), supplied by Johnson Matthey was wash coated with an aqueous slurry of catalyst powder (prepared substantially as described in the foregoing examples), dried at 110° C. and calcined at 800° C. for 2 hours to give a monolith catalyst having the composition 3.39 wt % Ni, 0.75 wt % Mn, 20.2 wt % MgO on cordierite honeycomb (400 channels per square inch, 10 mm×172 mm). Alternatively, the supported catalyst could be prepared by impregnating the honeycomb with an aqueous solution of the catalyst precursors.

Test Procedure for Examples 10, 11 and 12

The catalytic partial oxidation reaction was carried out in a conventional flow apparatus using a quartz reactor with a length of 12 inches, an outside diameter of 19 mm and an inside diameter of 13 mm. Ceramic foam pieces of 99% Al₂O₃ (12 mm outside diameter×5 mm thick, with 45 pores per linear inch) were placed before and after the catalyst as radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The run was conducted at a CH₄:O₂ molar ratio of 2:1 with a combined flow rate of 7.7 SLPM (standard liters per minute), corresponding to a gas hourly space velocity of 431,720 hr⁻¹ and at a pressure of 5 psig (136 kPa). The reactor effluent was analyzed using a gas chromatograph equipped with a thermal conductivity detector. The carbon, hydrogen, and oxygen mass balances all closed to between 98% and 102%.

TABLE 2

| Ex. | Promoter | Temp. (reactor) °C. | GHSV × 10⁴ | % CH₄/O₂ Conv. | % CO/H₂ Sel. | % CO₂ Sel. | % Coke[a] | H₂:CO |
|---|---|---|---|---|---|---|---|---|
| 10 | Mn | 1063 | 43.1 | 77/98 | 96/90 | 4 | 24 | 1.88 |
| 11 | Mn | 1085 | 43.1 | 79/100 | 96/90 | 4 | 0.12 | 1.88 |
| 12 | Mn | 885 | 43.1 | 95/100 | 98/97 | 2 | n.d. | 1.98 |

As shown in Table 2, with the catalyst of Example 10, at a reactor temperature of 1063° C., the following results were obtained over a 6 hour run: 77% CH₄ conversion, 98% O₂ conversion, 96% CO selectivity, 90% H₂ selectivity, 4% CO₂ selectivity, and a H₂:CO molar ratio of 1.88. This catalyst showed high levels of coke deposition (24%).

The catalyst of Example 11, at a reactor temperature of 1085° C., gave the following results over a 6 hour run: 79% CH₄ conversion, 100% O₂ conversion, 96% CO selectivity, 90% H₂ selectivity, 4% CO₂ selectivity, and a H₂:CO molar ratio of 1.88. As noted in Table 2, small amount of coke deposition (0.12%) occurred.

The catalyst of Example 12, at a reactor temperature of 885° C., gave the following results over a 6 hour run: 95% $CH_4$ conversion, 100% $O_2$ conversion, 98% CO selectivity, 97% $H_2$ selectivity, 2% $CO_2$ selectivity, and a $H_2$:CO molar ratio of 1.98. No detectable coke was found by either TGA or HRTEM.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent documents, and publications cited herein are incorporated by reference to the extent that they describe pertinent materials or methods not explicitly set forth herein.

What is claimed is:

1. A method of converting a reactant gas mixture comprising a $C_1$–$C_5$ hydrocarbon and $O_2$ to a product gas mixture comprising $H_2$ and CO in a molar ratio of about 2:1, the method comprising contacting the reactant gas mixture at net partial oxidation promoting conditions of temperature and pressure with a catalyst comprising nickel, magnesium oxide, at least one promoter selected from the group consisting of manganese, molybdenum, tungsten, tin, rhenium, bismuth, indium, phosphorus and combinations thereof, and, optionally, a catalyst support selected from the group consisting of spinels, perovskites, magnesium oxide, pyrochlores, brownmillerites, zirconium phosphate, magnesium stabilized zirconia, zirconia stabilized alumina, silicon carbide, yttrium stabilized zirconia, calcium stabilized zirconia, yttrium aluminum garnet, alumina, cordierite, $ZrO_2$, $MgAl_2O_4$, $SiO_2$, and $TiO_2$.

2. The method of claim 1 wherein said step of contacting the reactant gas mixture with the catalyst comprises maintaining a temperature of about 600–1,300° C. and a pressure of about 850–3000 kPa.

3. The method of claim 1 wherein the $C_1$–$C_5$ hydrocarbon comprises at least about 80% methane by volume.

4. The method of claim 3 wherein the natural gas consists essentially of methane.

5. The method of claim 4 wherein the methane to $O_2$ molar ratio is about 1.5:1 to about 2.2:1.

6. The method of claim 5 wherein the molar ratio of methane to $O_2$ is about 2:1.

7. A The method of claim 1 wherein said step of contacting the reactant gas mixture with the catalyst includes maintaining a temperature of about 1,000–1,200° C. during said contacting.

8. The method of claim 1 further comprising preheating the reactant gas mixture to a temperature of about 300–700° C.

9. The method of claim 1 further comprising maintaining a space velocity of at least about 100,000 $hr^{-1}$ and converting at least about 85% of the hydrocarbon and about 100% of the $O_2$ to gaseous product containing CO and $H_2$ in a molar ratio of about 2:1 $H_2$:CO, with a selectivity of at least about 96% for CO and at least about 93% for $H_2$.

10. The method of claim 1 wherein the catalyst comprises about 1–50 wt % nickel supported on magnesium oxide and about 0.1–10 wt % of said promoter.

11. The method of claim 10 wherein said catalyst comprises about 1–6 wt % Ni, about 0.3–0.75 wt % Mn and about 10–20 wt % MgO on a cordierite honeycomb.

12. The method of claim 10 wherein said catalyst comprises about 13 wt % Ni and about 3 wt % of a promoter selected from the group consisting of Mn, Mo, W, Sn, Re, Bi, In and P, supported on MgO.

13. The method of claim 1 comprising accumulating no more than about 0.1 wt. % coke on said catalyst over a 12 hour period of time.

14. The method of claim 1 comprising contacting said catalyst and said reactant gas mixture at a gas hourly space velocity of at least 1,000,000 NL/kg/h.

15. In a process for the catalytic partial oxidation of a light hydrocarbon and oxygen to produce synthesis gas comprising CO and $H_2$, the improvement comprising: reducing coking of the catalyst by employing a promoted NiO—MgO catalyst, the promoter chosen from the group consisting of Mn, Mo, W, Sb, Re, Bi, In, K, and mixtures thereof, operating said process at superatmospheric reactant gas pressure and operating said process at a gas hourly space velocity of at least 1,000,000 NL/kg/h.

* * * * *

UNITED STATES PATENT AND TRADEMARK OFFICE
CERTIFICATE OF CORRECTION

PATENT NO.   : 6,402,989 B1
DATED        : June 11, 2002
INVENTOR(S)  : Anne M. Gaffney It is certified that error appears in the above-identified patent and that said Letters Patent is hereby corrected as shown below:

Column 12,
Lines 36-45, should read
-- 15. In a process for the catalytic partial oxidation of a light hydrocarbon and oxygen to produce synthesis gas comprising CO and $H_2$, the improvement comprising: reducing coking of the catalyst by employing a promoted NiO-MgO catalyst, the promoter chosen from the group consisting of Mn, Mo, W, Sb, Re, Bi, In, P and mixtures thereof, operating said process at superatmospheric reactant gas pressure and operating said process at a gas hourly space velocity of at least 1,000,000 NL/kg/h. --

Signed and Sealed this

Nineteenth Day of October, 2004

JON W. DUDAS
*Director of the United States Patent and Trademark Office*